United States Patent [19]

Sellberg

[11] 4,227,633
[45] Oct. 14, 1980

[54] WHEEL-LOCKING DEVICE TO SECURE VEHICLES ON THE CARGO PLATFORM OF TRANSPORT VEHICLES

[76] Inventor: Jan B. R. Sellberg, Banvägen 15, S-230 50 Bjärred, Sweden

[21] Appl. No.: 21,813

[22] Filed: Mar. 19, 1979

[30] Foreign Application Priority Data

Mar. 20, 1978 [SE] Sweden ............................... 7803163

[51] Int. Cl.³ ............................ B60R 9/00; B65J 1/22
[52] U.S. Cl. .............................. 224/42.28; 224/42.38; 224/42.4; 248/499; 248/505; 410/19
[58] Field of Search ............... 224/42.12, 42.26, 42.27, 224/42.28, 42.38, 42.4; 105/368 T, 464, 465; 248/499, 505

[56] References Cited

U.S. PATENT DOCUMENTS

| | | | |
|---|---|---|---|
| 1,708,231 | 4/1929 | Moore et al. | 105/368 T |
| 1,748,089 | 2/1930 | Stockton | 224/42.26 |
| 1,816,897 | 8/1931 | Fedderman et al. | 105/368 T |
| 3,537,548 | 11/1970 | Jeppesen | 105/368 T X |
| 3,937,436 | 2/1976 | Stewart | 248/499 |

Primary Examiner—Steven M. Pollard
Attorney, Agent, or Firm—Harness, Dickey & Pierce

[57] ABSTRACT

A wheel-locking device to secure vehicles on transport vehicle platforms, comprising a pivotally mounted stop member arranged to engage and hold the vehicle wheel in its raised position, a telescopic arm with controlled extension and retraction. At the outer end of said arm is pivotally mounted a bow arranged to be applied over the vehicle wheel. The telescopic arm is pivotally mounted at its lower point of attachment and so directed that in its raised position for the purpose of applying said bow over the vehicle wheel, said arm forms an acute angle to a vertical plane extending at right angles to the arm pivot axis through said point of attachment and is positioned on the opposite side of said vertical plane relative to the plane formed by said raised stop member, whereby said wheel will be firmly secured between said bow and said stop member.

3 Claims, 6 Drawing Figures

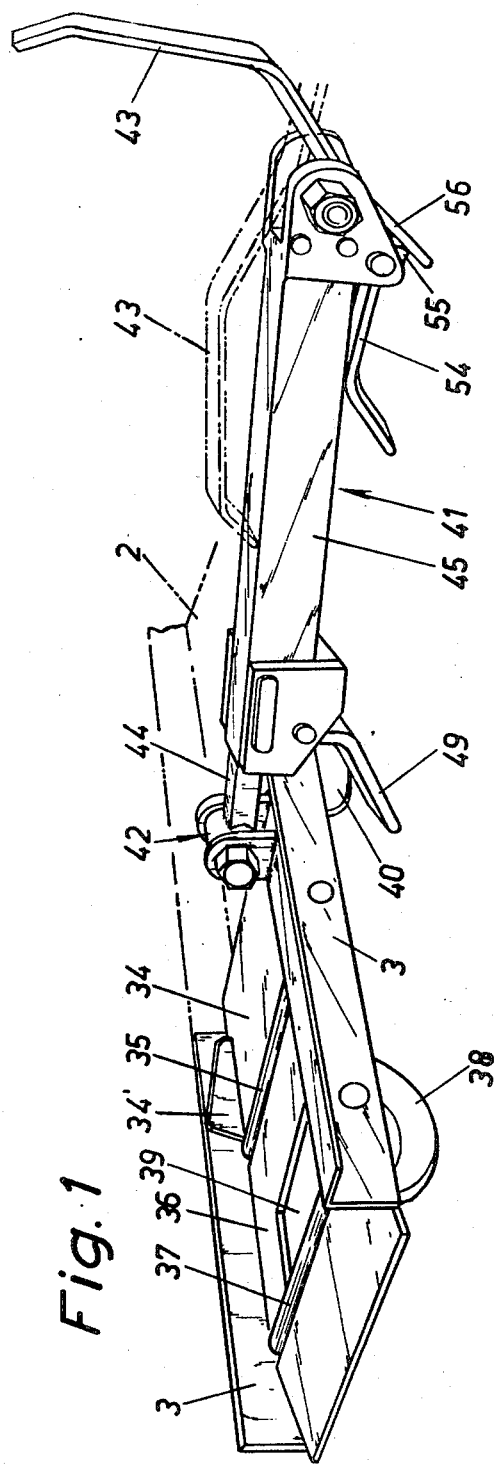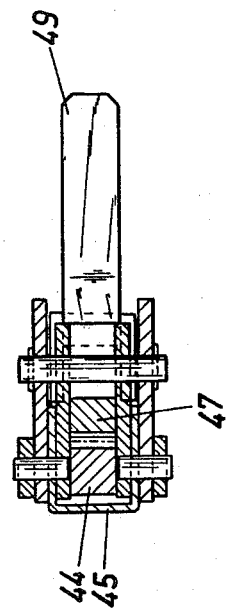

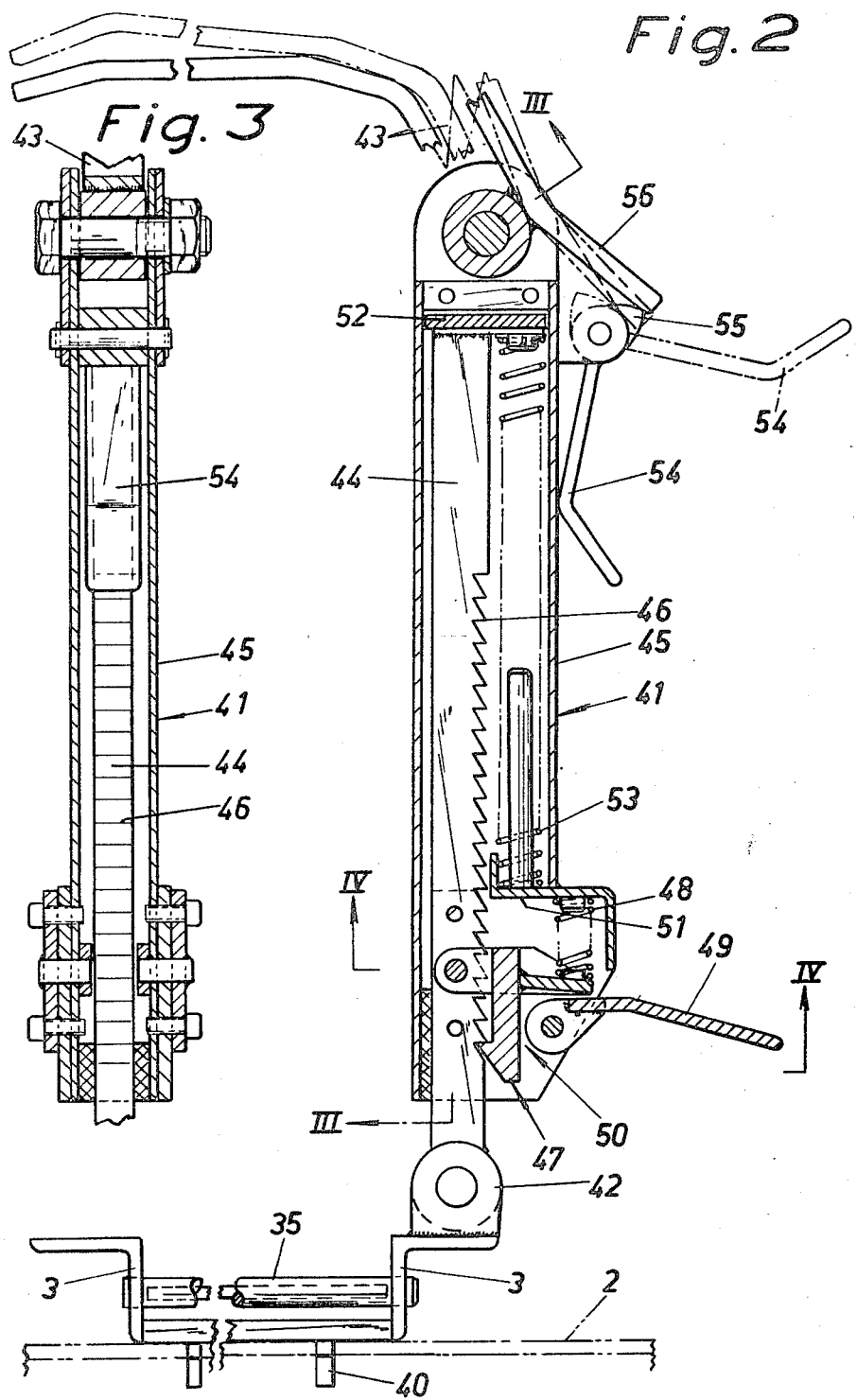

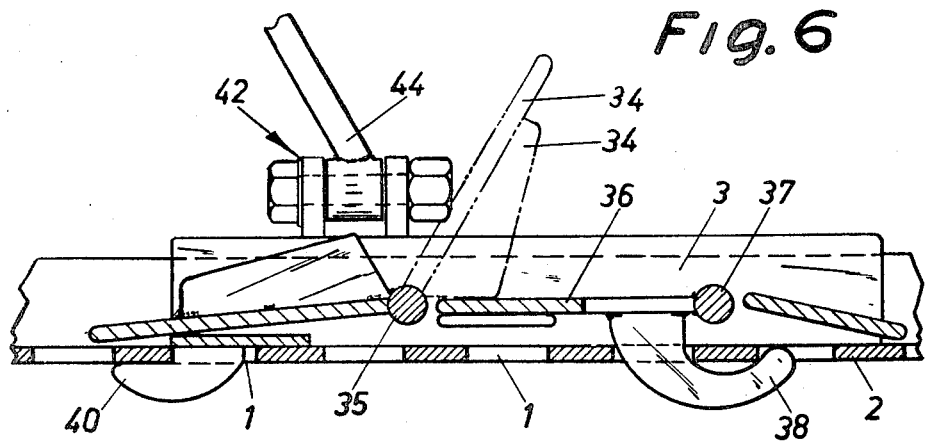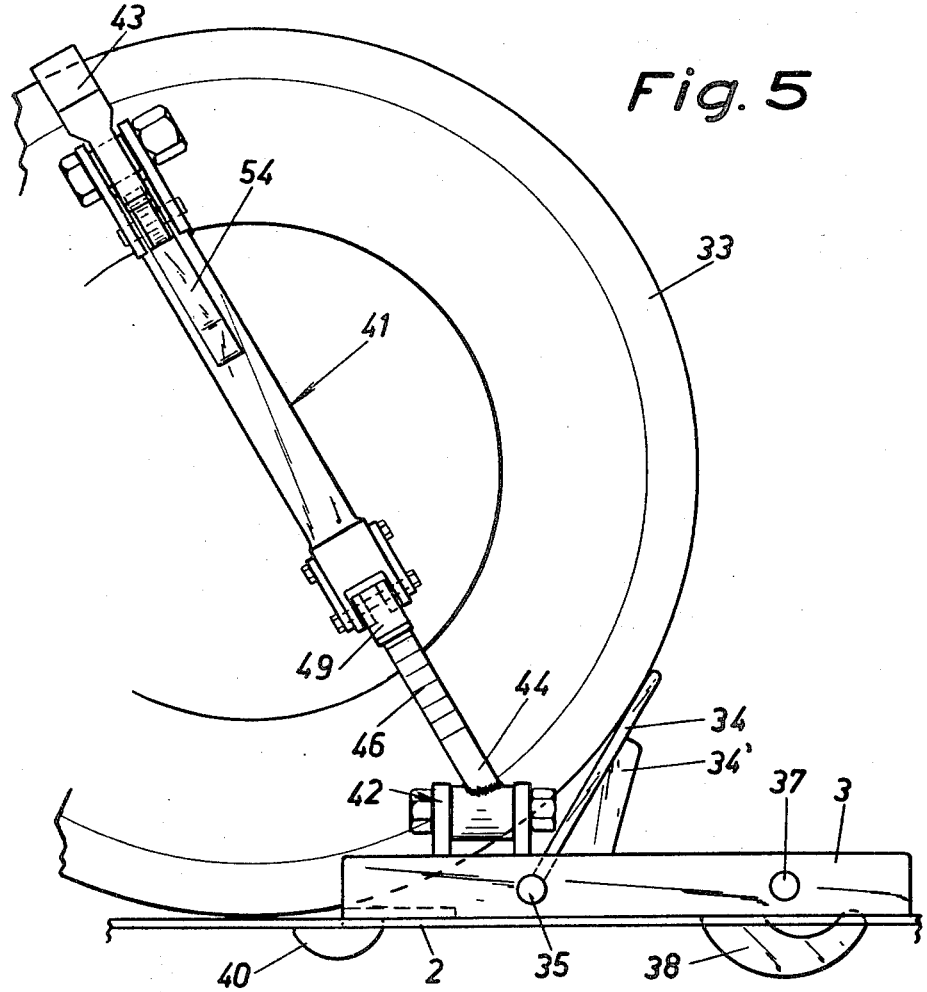

WHEEL-LOCKING DEVICE TO SECURE VEHICLES ON THE CARGO PLATFORM OF TRANSPORT VEHICLES

BACKGROUND OF THE INVENTION

The subject invention relates to and is a further development of wheel-locking devices of the kind intended to secure vehicles on movable platforms which are equipped with a stop member which may be raised from the movable platform for engagement with the wheel. Wheel-locking devices of this kind also comprise a bow intended to be applied over the wheel. In its raised position, the stop member is supported against a shoulder which prevents further pivoting of the stop member. The bow is articulated to a rigid, telescopically extensible arm which comprises a controllable blocking mechanism, the latter arranged to prevent extension of said telescopic arm beyond a pre-determined, set vertical position but at the same time to allow retraction of said arm. In its applied position over the tyre, the bow rests on the wheel and supports said arm in its set vertical position as a consequence of the weight of the movable part of said arm and its own weight.

SUMMARY OF THE INVENTION

The wheel-locking device in accordance with the invention is characterised in that the telescopic arm is pivotally mounted at its lower point of attachment and so directed that the arm, in its raised position for the purpose of application of the bow over the vehicle wheel, forms an acute angle to a vertical plane extending at right angles to the pivot axis through the point of attachment and is positioned on the opposite side of said vertical plane relative to the plane formed by the raised stop member, whereby the wheel will be secured between the bow and the stop member.

BRIEF DESCRIPTION OF THE DRAWINGS

The invention will be described in closer detail in the following with reference to one embodiment thereof illustrated in the accompanying drawings, wherein FIG. 1 is a perspective view of the wheel-locking device in accordance with the subject invention in a non-operative position, FIG. 2 is a longitudinal section through the telescopic arm, FIG. 3 is a section along line III—III of FIG. 2, FIG. 4 is a section along line IV—IV of FIG. 2, FIG. 5 is a lateral view of the wheel-locking device when applied over a vehicle wheel, and FIG. 6 is a longitudinal section through the wheel-locking device of FIG. 5.

DETAILED DESCRIPTION OF A PREFERRED EMBODIMENT

The wheel-locking device is arranged on the rail 2 which guides the vehicle wheel 33 and which rail is provided with apertures 1. A stop member 34 is pivotally mounted on a shaft 35 which is secured in the vertical side plates 3 of the wheel-locking device. The stop member 34 is provided adjacent each side plate 3 with a stop shoulder 34'. A plate 36, on which the stop shoulders 34' of said stop member are supported, is pivotally mounted on a shaft 37 extending between the side plates. To the plate 36 are rigidly secured two hook members 38 which are arranged to be inserted in the apertures 1 formed in the guide rail 2 to secure the wheel-locking device in position. Furthermore, the plate 36 is formed with a notch 39. The wheel-locking device further comprises two hook members 40 which like hook members 38 are intended to be inserted in the apertures 1 in the guide rail 2 to secure the wheel-locking device in position. A telescopic arm 41 is pivotally mounted in an attachment 42 positioned on one of the side plates 3 of the wheel-locking device and extends at an acute angle to its pivot axis. At the free end of the telescopic arm a bow 43 is pivotally mounted.

As appears from FIGS. 2, 3, and 4, the telescopic arm consists of a rackrail 44 which is secured in the attachment 42, and of a sleeve 45 arranged to be displaced over said rackrail. Together with a catch 47 which is pivotably mounted in the sleeve, a compression spring 48 which is arranged to force said catch 47 into engagement with any one of the rackrail teeth 461 and an operating lever 49, the teeth 46 of the rackrail 44 form a blocking mechanism holding the telescopic arm 41 in position. As a unit, the blocking mechanism is designated by numeral 50. Inside the sleeve 45 a spring 53 is held between a projection 51 extending crosswise relative to the spring, and a plate 52 arranged at the upper end of the sleeve for the purpose of dampening the movements of the telescopic arm.

An operating lever 54 is provided to secure the bow 43 over the tyre face of a wheel, said lever 54 formed with an eccentric control body 55 arranged for engagement with a portion 56 of the bow 43.

Securement of the wheel-locking device to the guide rail 2 of a transport vehicle cargo platform is effected by introduction of the hook members 40 and of the hook members 38 on the pivotable plate 36 in the apertures 1 formed in the rail 2.

When the wheel-locking device assumes the position illustrated in FIG. 1, the wheels of a vehicle may freely pass over the wheel-locking device. In its lower (non-raised) position, the height of the arm above the plane of the transport vehicle is minimal, allowing the vehicle wheels to pass over it easily without damage to the vehicle from any upwardly projecting parts of the lock, should the vehicle wheels for any reason leave the guide rail 2, for instance when the vehicle is driven onto the transport vehicle platform.

When a vehicle wheel 33 is to be locked in position, the stop member 34 is pivoted about the shaft 35 until the stop shoulder 34' abuts against the plate 36, which thus prevents further pivoting of the stop member 34. The vehicle is thereafter driven on the guide rails 2, until the vehicle wheel abuts against the raised stop member 34. When the vehicle wheel 33 is in correct position, the telescopic arm 41 is pivoted about articulation point 42 towards the wheel and the arm 41 is extracted until it becomes possible to apply the bow 43 over the rolling face of the tyre. The arm 41 is then released, the latter then retracting somewhat by its own weight, until the bow 43 engages the rolling face of the tyre and retains the arm in its raised position. The bow 43 may be tightened against the tyre by pivoting of the operating lever 54 in the direction towards the sleeve 45.

FIG. 5 illustrates the wheel-locking device in its position applied over the vehicle wheel 33. In this position, the bow 43 and the stop plate 34 engage the rolling face of the wheel on opposite sides of a vertical plane extending through the articulation point 42 at right angles to the guide rail 2. In accordance with the illustrated embodiment the angle of said vertical plane to a plane extending in parallel with the stop member as well as the angle of said vertical plane to a plane extending at right angles to the rail in the lengthwise direction of the arm 41 when raised over the wheel is essentially 30°. As a result, the wheel is sefely secured between the stop member 34 and the bow 43.

As appears from FIG. 2, extension of the telescopic arm from its set position is prevented by the blocking mechanism 50, the catch 47 of the latter engaging one of the teeth of the row of teeth 46 through the action of the spring 48. The catch 47 may be disengaged from the teeth to make extension of the telescopic arm possible by pivoting the operating means 49 counter-clockwise (FIG. 2) against the action of spring 48.

When the telescopic arm is extended sufficiently far and the bow is applied over a tyre, the operating member 49 is released, bringing the catch 47 into engagement with one of the teeth 46. As mentioned above, the blocking mechanism does not prevent shortening (retraction) of the telescopic arm but instead the latter retracts by its own weight, until this retraction is prevented by the bow which is applied over the tyre.

To release the vehicle wheel from the wheel-locking device, the operating member 49 need only be lifted and the telescopic arm be extended over a short distance, until the bow goes clear of the tyre, whereafter the telescopic arm is pivoted outwards to the position illustrated in FIG. 1. It is now possible to drive the vehicle off the platform and to pivot the stop member 34 about its pivot shaft 35 to the position illustrated in FIG. 1.

A wheel-locking device secured in the guide rail 2 may be easily detached and displaced along the rail. When the wheel-locking device is in the position illustrated in FIG. 1, it is possible to insert a hand through the notch 39 to pivot the plate 36 counter-clockwise about the shaft 37, so as to disengage the hook members 38 secured to the plate 36 from the aperatures 1 formed in the rail 2. The hook members 40 which are immobile relative to the side plates 3 of the wheel-locking device may thereafter be disengaged from the apertures 1 in the rail to release the wheel-locking device therefrom by lifting the wheel-locking device at the end thereof opposite the immobile hook members.

The invention is not limited to the embodiment as described above but several modifications are possible within the scope of the appended claims.

What I claim is:

1. An improved wheel-locking device for securing vehicles on the movable cargo platform of transport vehicles, comprising a stop member arranged to be raised from said movable platform for engagement with one of the wheels of said vehicle, a bow intended to be applied over said vehicle wheel, a shoulder supporting said stop member in the raised position of the latter and preventing further pivoting of said stop member, a telescopically extensible arm at the outer end of which said bow is pivotally mounted, said telescopically extensible arm comprising a controllable blocking mechanism arranged to prevent extension of said telescopic arm beyond a pre-determined, set vertical position but at the same time to allow retraction of said arm, said bow, in its applied position over the tyre of said vehicle wheel, resting on said wheel and supporting said arm in its set vertical position, as a consequence of the weight of the movable part of said arm and its own weight, the improvement comprising said telescopic arm being pivotally mounted at its lower point of attachment and being so directed that said arm, in its raised position for the puprose of application of said bow over said vehicle wheel, forms an acute angle to a vertical plane extending at right angles to the arm pivot axis through said point of attachment of said arm and is positioned on the opposite side of said vertical plane relative to the plane formed by said raised stop member, whereby said vehicle wheel will be secured between said bow and said stop member.

2. An improved wheel-locking device as claimed in claim 1, wherein said telescopic arm is a sleeve arranged for displacement over a rack rail, and wherein a catch connected with said sleeve engages one of the teeth of said rack rail through the action of a spring and is arranged to prevent extension of said telescopic arm, an operating means being connected with said catch to bring said catch out of its position of engagement wherein it prevents movement of said telescopic arm.

3. An improved wheel-locking device as claimed in claim 1, comprising an operating lever operable to tighten said bow about said vehicle wheel.

* * * * *